J. G. STEWART.
JOINTING OF PIPES AND THE LIKE.
APPLICATION FILED APR. 8, 1910.
978,504.
Patented Dec. 13, 1910.
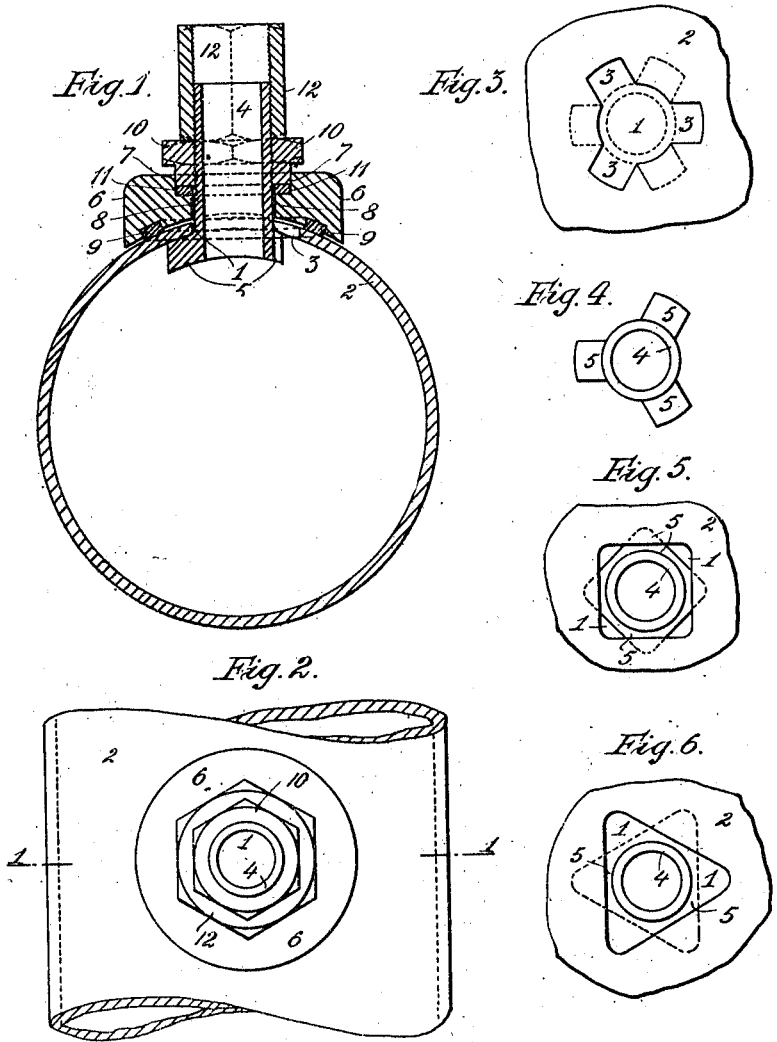
Witnesses
C. M. Sweeney
S. J. Henderson
Inventor:
John Graham Stewart
By Calvin Calvert
Attys

UNITED STATES PATENT OFFICE.

JOHN G. STEWART, OF GLASGOW, SCOTLAND, ASSIGNOR TO STEWARTS & LLOYDS LIMITED, OF GLASGOW, SCOTLAND.

JOINTING OF PIPES AND THE LIKE.

978,504.  Specification of Letters Patent.  Patented Dec. 13, 1910.

Application filed April 8, 1910. Serial No. 554,201.

*To all whom it may concern:*

Be it known that I, JOHN GRAHAM STEWART, a subject of the King of the United Kingdom of Great Britain and Ireland, and residing at Glasgow, Scotland, have invented a certain new and useful Improvement in the Jointing of Pipes and the Like, of which the following is a specification.

This invention relates to the jointing of pipes and the like and more especially to the jointing of branch pipes to main pipes, by means of flanges formed on the branch pipe and entered through correspondingly shaped openings in the main pipe.

In the accompanying drawings which illustrate the invention Figure 1 is a transverse sectional elevation, taken on the line 1—1 of Fig. 2, of a main pipe fitted with the improved joint for connecting a branch pipe thereto and Fig. 2 is a plan view corresponding to Fig. 1. Fig. 3 is a plan view of part of the main pipe with the connections or fittings removed and formed with an orifice or opening. Fig. 4 is a plan view of a detail hereinafter referred to. Figs. 5 and 6 are plan views corresponding to Fig. 3, but showing the orifice in the main pipe of different shapes and showing the detail illustrated by Fig. 4 shaped according to the orifice and inserted in position.

As shown, an orifice 1 is formed in the main pipe 2 at the point where it is desired to connect a branch pipe. This orifice 1 may be of any suitable shape; for instance it may be circular with slots extending radially from the orifice 1 as shown at Fig. 3, or it may be square as shown in Fig. 5 or triangular as shown in Fig. 6. Through this orifice or opening 1 is passed a short tube or pipe connection 4 formed with flanges 5 (or it may be a flange 5 as the case may be) at one end and formed with a screw threads from the other end and for the greater part of its length. As shown in Fig. 3 there are three parts 3 cut away from the circumference of the orifice 1 and as shown in Fig. 4 there are three flanges 5 formed on the end of the pipe connection 4; whereas when the orifice 1 is square or triangular, the flange 5 is formed as shown at Fig. 5 or Fig. 6. That is, the flange or flanges 5 at the end of the pipe connection 4 will be of the same shape as the orifice 1 and of a slightly smaller size so as to pass through the same. After the end of the pipe connection 4, formed with the flanges 5, is inserted into the orifice 1 it is partially rotated so as to take up the position shown by dotted lines in Fig. 3 or in Figs. 5 and 6.

A circular plate or cover 6 formed with a recess 7 and a hole or passage 8 is fitted around the pipe connection 4. This plate 6 is of such a size as to cover the orifice 1 and lead or other suitable packing 9 is fitted (preferably in a groove) between the same and the main pipe 2. A nut 10 is screwed on to the pipe connection 4 so as to enter the recess 7 of the plate 6 and lead or other suitable packing 11 is fitted between the bottom of the recess 7 and the nut 10. The lower face of the plate 6 and the upper faces of the flanges 5, that is, the faces or surfaces next the main pipe 2, are formed of the same contour as said main pipe 2, so that the nut 10 will secure the plate 6 and the pipe connection 4 to the main pipe 2. A hexagonal or other shaped tubular connection 12 is screwed on to the pipe connection 4 and to this connection 12 the branch pipe is screwed.

Having now described my invention what I claim and desire to secure by Letters Patent of the United States is:—

The combination with a main pipe having an orifice, of a tube screw-threaded externally and having at one end a flange passed through said orifice, a plate formed with a recess on its outer face and a groove on its inner face, said plate surrounding the tube and covering the orifice, packing in said groove interposed between the plate and the outer face of the main pipe, a nut in screw-threaded engagement with said tube, said nut entering the recess in said plate, and packing in said recess interposed between the nut and the plate.

In testimony whereof I have signed my name to this specification in the presence of two subscribing witnesses.

J. G. STEWART.

Witnesses:
  WALLACE CRANSTON FAIRWEATHER,
  JOHN McCLEARY, Jr.